Dec. 9, 1952     T. C. KANE     2,621,053
EXPANSIBLE HOLDER
Filed March 21, 1951
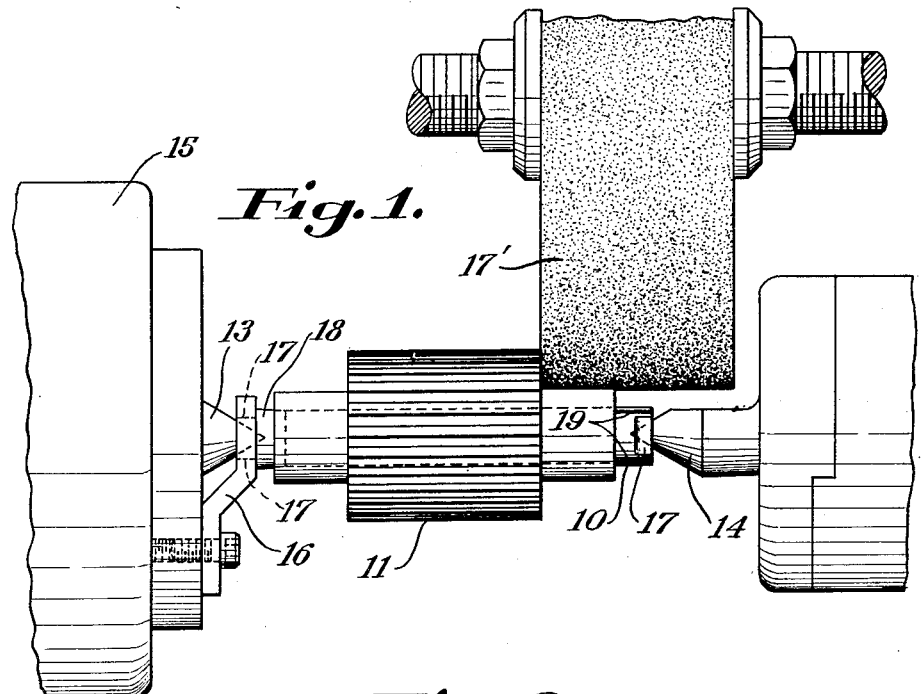
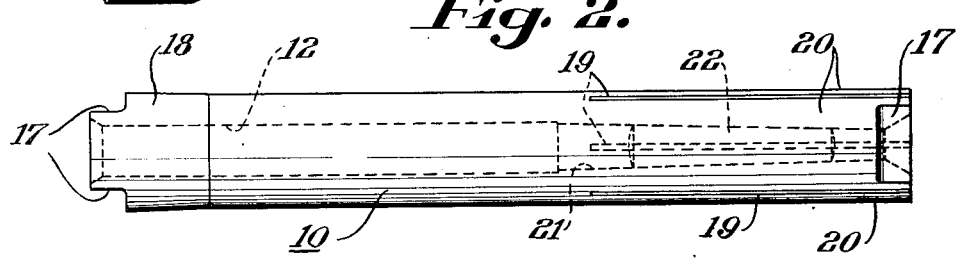
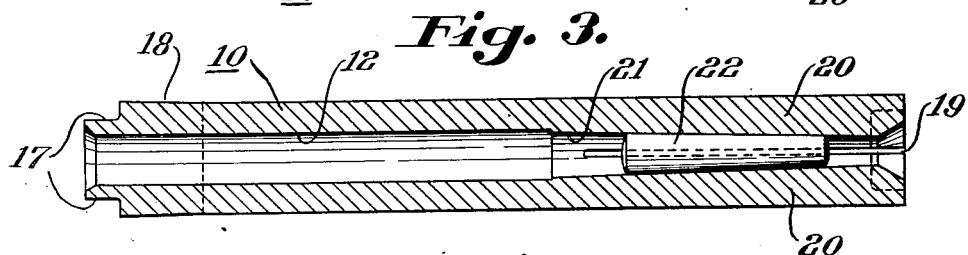
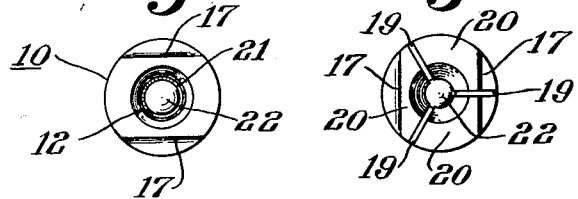
INVENTOR
*Thomas C. Kane*

Patented Dec. 9, 1952

2,621,053

UNITED STATES PATENT OFFICE 2,621,053

EXPANSIBLE HOLDER

Thomas C. Kane, Mahoning County, Ohio, assignor to The Commercial Shearing & Stamping Co., Youngstown, Ohio, a corporation of Ohio Application March 21, 1951, Serial No. 216,835

3 Claims. (Cl. 279—2)

This invention relates to expansible shafts, and more particularly to expansible workpiece and tool holders, such as arbors, mandrels and chucks supported at one or both ends.

A conventional solid mandrel is mounted in an opening through a workpiece for the purpose of holding the workpiece so that it will rotate truly about the axis of rotation of the mandrel in a machine tool or the like. A perfect fit between the mandrel and the workpiece opening is necessary to obtain this objective and in practice this objective is not fully obtained because the opening through the workpiece is not of perfect uniform diameter and consequently the workpiece tends to rock slightly relative to the mandrel. This seriously disturbs the accuracy of machining or grinding of the workpiece and is a particular problem in the case of finishing gears for gear pumps, where the sides of the gears should be in exact alignment with each other in order to maintain a close fit of the sides of the gears against the enclosed casing of the pump. This difficulty is not overcome by conventional forms of expansible mandrels because the expansion takes place generally uniformly along the whole length of the mandrel, without regard to variations in diameter along the length of the workpiece opening.

I have invented a new form of expansible workpiece holder which truly centers the workpiece regardless of normal variations of diameter along the length of the opening through the workpiece, and which is also practical to construct and to operate. One end of the holder is enlarged to slide tightly against one end of the workpiece opening, and the other end of the holder is expansible to engage the other end of the workpiece opening. In this way the holder tightly engages the opposite ends of the opening through the workpiece but is spaced from and therefore unaffected by the intermediate portions of the workpiece opening. To expand one end of the holder I preferably split the said end of the holder radially and form an opening axially through the holder which is adapted to receive a tapered pin and has a constricted passage of less diameter than the pin adjacent the split end of the holder. When the pin is pushed against the constricted passage it wedges the split end outwardly against the workpiece, and when the pin is pushed back in the opposite direction the split end springs back to its original position to release the workpiece and permit it to be drawn off the holder over the split end.

Further novel features and advantages of the holder of my invention will become apparent from the following detailed description of a present preferred embodiment of my invention and in the accompanying drawings of the same, in which Figure 1 is a partially broken away side elevation of a finishing machine with a workpiece mounted on a mandrel embodying the invention;

Figure 2 is an enlarged side elevation of the mandrel shown in Figure 1;

Figure 3 is an axial sectional view of the mandrel; and

Figures 4 and 5 are end views of the mandrel taken from the right and left, respectively, of Figure 2.

Referring in detail to the drawings, there is provided a mandrel 10 supporting a gear blank 11. An axial opening 12 extends through the mandrel and is conically enlarged at its opposite ends to receive centers 13 and 14 of a machine tool 15. A driving dog 16 engages flat surfaces 17 at one end of the mandrel 10 to rotate the mandrel in a conventional manner on the centers 13 and 14. A separately mounted and oppositely driven grinding wheel 17' finishes the sides and hubs of the gear blank 11 as it is rotated by the dog 16.

The mandrel 10 has a generally cylindrical outer surface except at the end of the mandrel adjacent the center 13, where the mandrel increases in diameter and has a conical end 18. The other end of the mandrel has three radially extending and uniformly spaced slits 19 which form integral fingers 20 adapted to flex outwardly to engage the end of the gear blank 11 adjacent the dead center 14. The opening 12 is cylindrical from adjacent the conical end 18 of the mandrel to adjacent the beginning of the slits 19, and from there it tapers conically (exaggerated in Figures 2 and 3 for purposes of illustration) to form a constriction 21 having a minimum diameter near the ends of the fingers 20. The outer surfaces along the length of the mandrel 10 and its inner surfaces along the opening 12 are all concentric with a common axis, which becomes the axis of rotation of the mandrel and of the workpiece 11 when the mandrel is rotated on the centers 13 and 14.

A tapered pin 22 is inserted in the opening 12 from the conical end 18 of the mandrel, with the tapered end of the pin extending toward the constriction 21. The pin 22 is preferably in the form of a truncated cone having the same apex angle as the conical constriction 21, with the larger end of the pin smaller in diameter than the cylindrical portion of the opening 12 and the smaller end of the pin slightly larger in diameter than the narrowest portion of the constriction 21. The pin is held within the opening 12 concentrically with the axis of the mandrel, and when the larger end of the pin is tapped the pin is forced into the constriction 21 and the fingers 20 are flexed outwardly and equidistantly from the radius of the mandrel.

When the mandrel 10 is to be used it is inserted through an opening in a tool or workpiece such as the gear blank 11 until one end of the workpiece firmly engages the conical end 18 of the mandrel. A rod is then inserted into the opening 12 from the conical end 18 of the mandrel until it engages the larger end of the pin 22, and the exposed end of the rod is tapped with a hammer to force the pin into the constriction 21 until the fingers 20 spread and firmly engage the other end of the workpiece. The mandrel is then mounted on a machine tool and is rotated in the usual way with the piece firmly anchored on the mandrel against movement relative to the mandrel in any direction. When the operation on the workpiece is completed the mandrel is removed from the machine tool and the pin 22 is moved out of wedging engagement with the fingers 20 by tapping the exposed end of a rod inserted into the opening 12 at the slitted end of the mandrel. The fingers 20 thereupon spring back to their normal position out of engagement with the opening through the workpiece and the workpiece is withdrawn from the mandrel over the slitted end of the mandrel.

While I have illustrated and described a present preferred embodiment of the invention, it will be recognized that the invention is not limited thereto but may be otherwise variously embodied and practiced within the scope of the appended claims.

I claim:

1. An expansible shaft comprising a body with a generally cylindrical outer surface along its intermediate portion with gradually increasing diameter at one end to form a portion of a cone at that end and having axially extending fingers at the other end, said fingers being adapted to be flexed radially outwardly, the outer surfaces of the fingers forming substantially a cone when the fingers are flexed outwardly but lying generally within the cylindrical plane of the intermediate portion of the body when the fingers are released, with an axially extending tapered opening through the body along said fingers for receiving means for wedging the fingers radially outwardly, whereby said shaft is adapted to grip an annular element such as a workpiece or tool by passing the shaft through the element until the conical end of the shaft engages the element at one end of the opening therethrough, and then spreading the fingers to engage the element at the other end of the opening therethrough.

2. An expansible shaft comprising a body with a cylindrical outer surface along its intermediate portion, with a conical enlargement at one end of the body, and with axially extending and radially flexible fingers at the other end of the body, the fingered end of the body having a tapered opening extending axially along the fingers, and a correspondingly tapered member in said opening adapted to be moved axially in the direction of taper to wedge the fingers radially outwardly, whereby the shaft is adapted to grip an annular element such as a workpiece or tool by passing the shaft through the element until the conical enlargement at one end of the body grips the element at one end of the opening therethrough, and then wedging the member against the fingers to engage them with the element at the other end of the opening therethrough.

3. An expansible arbor and the like comprising a body with a generally cylindrical outer surface, one end of the body being enlarged and tapering toward an intermediate portion of the body, and the other end of the body being radially expansible to form an enlargement at the said other end of the body, the expansible end of the body being generally of the same outer diameter as the intermediate portion of the body when not radially expanded, and means for expanding the expansible end of the body, whereby the enlarged and expanded ends of the body are adapted to grip an annular element such as a workpiece or tool at the opposite ends of the opening therethrough while the intermediate portions of the body extend through said opening out of contact with the element.

THOMAS C. KANE.

REFERENCES CITED

The following references are of record in the file of this patent:

UNITED STATES PATENTS

| Number | Name | Date |
| --- | --- | --- |
| 255,010 | Micholson | Mar. 14, 1822 |
| 649,571 | Bartlett | May 15, 1900 |
| 1,528,353 | Waterman | Mar. 3, 1925 |
| 1,930,669 | Barcoe et al. | Oct. 17, 1933 |
| 2,494,899 | Ross | Jan. 17, 1950 |
| 2,541,078 | Lescallette | Feb. 13, 1951 |